(12) United States Patent
Berlin et al.

(10) Patent No.: US 8,298,405 B2
(45) Date of Patent: Oct. 30, 2012

(54) APPARATUS AND METHOD FOR RESUSCITATING AND REVITALIZING HYDROCARBON FUELS

(75) Inventors: Alvin J. Berlin, Lakeville, CT (US); Ralph H. Wright, Lakeville, CT (US)

(73) Assignee: Advanced Power Systems International, Inc., Lakeville, CT (US)

( * ) Notice: Subject to any disclaimer, the term of this patent is extended or adjusted under 35 U.S.C. 154(b) by 878 days.

(21) Appl. No.: 12/234,193

(22) Filed: Sep. 19, 2008

(65) Prior Publication Data

US 2009/0090656 A1    Apr. 9, 2009

Related U.S. Application Data

(63) Continuation of application No. PCT/US2007/064423, filed on Mar. 20, 2007.

(60) Provisional application No. 60/783,883, filed on Mar. 20, 2006.

(51) Int. Cl.
*C10G 29/02* (2006.01)

(52) U.S. Cl. ........... 208/292; 44/321; 44/324; 431/4; 502/341; 502/328; 420/587; 420/559

(58) Field of Classification Search ............ 208/292; 502/354, 331, 336, 559
See application file for complete search history.

(56) References Cited

U.S. PATENT DOCUMENTS

| 5,393,723 | A | * | 2/1995 | Finkl | 502/341 |
| 5,580,359 | A | * | 12/1996 | Wright | 44/321 |
| 5,728,913 | A | * | 3/1998 | Finkl | 585/899 |
| 6,024,073 | A | * | 2/2000 | Butt | 123/538 |

OTHER PUBLICATIONS

Office Action Australian Patent Office, related copending foreign application, Australian Patent Appln. 2007226877, issued Sep. 24, 2010.

* cited by examiner

*Primary Examiner* — Melvin C Mayes
*Assistant Examiner* — Colette Nguyen
(74) *Attorney, Agent, or Firm* — Rossi, Kimms & McDowell LLP

(57) ABSTRACT

The invention provides a metal alloy fuel catalyst for decontaminating a hydrocarbon fuel, including diesel and bio-diesel fuel, of a bacterial contamination and for improving fuel combustion. The metal alloy fuel catalysts preferably includes about 70% Sn, about 22% Sb, about 4% Bi, and about 4% Pb, although other formulations are possible. The fuel catalyst can take the form of an in-line component in a fuel system or be coated within a fuel storage container.

8 Claims, 4 Drawing Sheets

US 8,298,405 B2

APPARATUS AND METHOD FOR RESUSCITATING AND REVITALIZING HYDROCARBON FUELS

CROSS-REFERENCE TO RELATED APPLICATIONS

This application is a bypass continuation application of and claims priority from PCT/US2007/064423 filed Mar. 20, 2007, which in turn claims priority from U.S. Provisional Patent Application Ser. No. 60/783,883, filed on Mar. 20, 2006, the contents of each of which are incorporated herein in their entireties by reference.

FIELD OF INVENTION

The present invention relates in general to methods and devices for treating fuels prior to combustion in order to increase combustion efficiency and thereby reduce exhaust emissions, and further to methods and devices for treating hydrocarbon fuels in order to resuscitate and revitalize such fuels in the event of bio-contamination and to improve combustion efficiency.

BACKGROUND OF INVENTION

It has been an objective of many individuals within different industries to develop devices and methods for improving the combustion efficiency of hydrocarbon fuel burning systems. A major breakthrough in improving fuel combustion efficiency was the development of fuel catalysts that can be used to treat hydrocarbon based fuels prior to combustion. Examples of such fuel catalysts are disclosed in U.S. Pat. Nos. 5,580,359; 5,738,692; 6,000,381; 6,306,185; and 6,770,105, the contents of each of which are herein incorporated by reference, which describe and claim a number of fuel catalyst formulations that have proven effective in improving combustion efficiency. In general, the fuel catalysts have been incorporated within in-line canisters or drop-in units in order to treat fuel prior to combustion and to maintain the stability of the fuel during storage, although other methods of employing the catalysts include the coating of interior surfaces of fuel storage containers or fuel lines with the catalyst materials.

In addition to improving combustion efficiency, there is also a need to protect fuels from various forms of contamination that may impair or reduce combustion efficiency. For example, micro-bacterial growth within diesel fuels has been known to cause operational problems, corrosion, and sediment build-up within diesel engine fuel systems. The growth of microbes in fuel as a contamination problem is acknowledged in the "Recommended Guidelines on Diesel Fuel" published by the Engine Manufacturer's Association of Chicago, Ill. In fact, many microorganisms have been demonstrated to utilize petroleum fuel products to fulfill their nutritional requirement for carbon resulting in a degradation of fuel.

Accordingly, in addition to improving combustion efficiency and maintaining the stability of fuel, it would also be desirable to provide a method and device capable of resuscitating and revitalizing fuel that would normally be considered sub-optimal or poor due to the above-described bio-contamination.

SUMMARY OF THE INVENTION

The present invention provides a method and device for resuscitating and revitalizing hydrocarbon fuels which have a bio-contaminated. A fuel catalyst is utilized to treat the fuel to remove the bio-contamination prior to combustion. In a preferred embodiment, a fuel catalyst alloy having a formulation composed of Sn, Sb, Bi, and Pb, and most preferably about 70% Sn, about 22% Sb, about 4% Bi, and about 4% Pb, is utilized to resuscitate and revitalize fuels that have been bio-contaminated as well as to improve combustion efficiency.

In one preferred method of operation, fuel is circulated through a canister containing the fuel catalyst until the composition of the fuel has been altered to eliminate bio-contamination thereby rendering it acceptable for combustion. The fuel catalyst may be utilized with both liquid and gas fuels to improve combustion efficiency and/or eliminate bio-contamination prior to combustion.

In other preferred embodiments, the fuel catalyst comprises a three component catalysts, preferably including about 70% Sn, about 20% Sb, and about 10% Bi, or a two component catalyst. Still further, the catalyst may be provided in the form of pellets, thin films, nano-structures, foam materials or any other structure that allows fuel to be brought into contact with a surface of the fuel catalyst.

BRIEF DESCRIPTION OF THE DRAWINGS

The invention will be described in detail with reference to certain preferred embodiments thereof and the accompanying drawings, wherein.

DETAILED DESCRIPTION OF THE PREFERRED EMBODIMENTS

The present invention provides a method and device for resuscitating and revitalizing hydrocarbon fuels to eliminate bio-contamination through the use of a metal alloy fuel catalyst. The inventors have discovered that a number of different types of fuel catalysts, and particularly metal alloy fuel catalysts of the types described in the above-referenced patents, may be employed for decontamination of hydrocarbon based fuels. In a preferred embodiment, the metal alloy fuel catalyst includes about 70% Sn, about 22% Sb, about 4% Bi, and about 4% Pb. While this is presently the most preferred formulation of the catalyst, it will be understood that variations of the percentages of elements, the type of elements and the number of elements are possible within the scope of the invention.

Experiments were commissioned and conducted at the University of Connecticut to investigate the viability and efficacy of using a fuel catalyst to eliminate bio-contamination in fuels as described above. The results of these experiments are discussed in detail below. It will be noted that the metal alloy fuel catalyst employed in the experiments is referred to as "Formula C", where the Formula C catalyst has the preferred composition of 70% Sn, 22% Sb, 4% Bi, and 4% Pb described above. The experiments were conducted utilizing both diesel and bio-diesel fuels, however, it should be noted that the scope of the invention is not limited to the specific fuels utilized in the described experiments, but instead, can be applied to any hydrocarbon-based fuel in either liquid or gas form.

Figure 1:
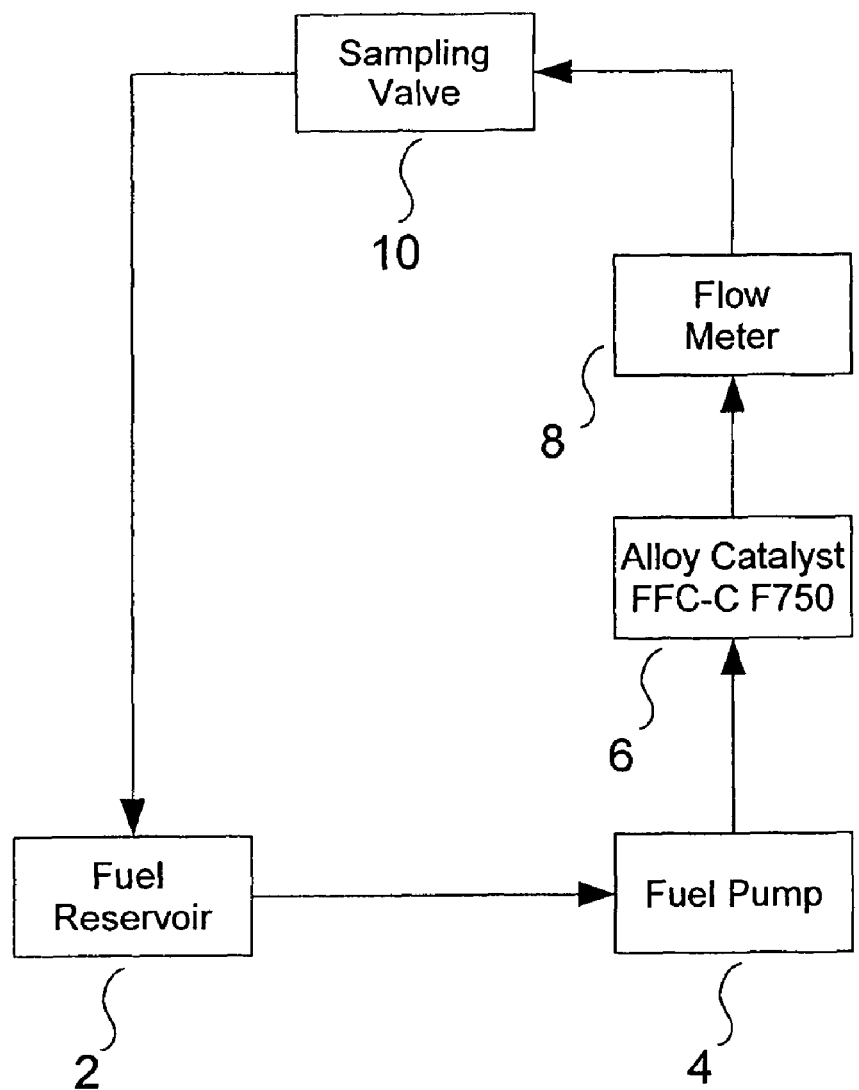
FIG. 1 is a block diagram showing a circulating system for adding the catalyst to a fuel and testing the efficacy thereof.

As shown in FIG. 1, a re-circulating system designed to simulate a diesel engine fuel system was constructed consisting of a fuel reservoir 2, a variable rate fuel pump 4, an in-line catalyst system 6, a flow meter 8, and sampling valve 10 for removal of fluid samples. The specific in-line catalyst system employed in the experiment was a Fitch Fuel Catalyst (FFC) Model F 750 metal alloy fuel catalyst incorporating Formula C, which was manufactured and supplied by Advanced Power Systems International, Inc. of Lakeville, Conn.

In order to perform the experiment, two liters of commercially available diesel fuel (DF-2) were inoculated with the Pseudomas Oleovorans bacteria strain grown in a 50:50 organic to inorganic growth medium. The inoculated diesel fuel was allowed to incubate for approximately two months in containers. The diesel fuel slowly turned visibly turbid over the two-month incubation period due to bacterial growth in a manner similar to actual contamination that might be found in real world situations.

Pseudomas Oleovorans is representative of psychotropic bacteria, which have a preference for lower temperatures and are commonly found in hydrocarbon fuels. The particular Pseudomas Oleovorans used in the experiment was obtained from the American Type Culture Collection (ATCC) and had been previously isolated from machine shop cutting oils and has demonstrated the capability of utilizing alkanes found in fuels. The species has also been isolated in petroleum contaminated arctic soils.

The contaminated diesel fuel DF-2 was placed in the fuel reservoir 2 and circulated through the apparatus of FIG. 1 so that the diesel fuel ran through the in-line metal alloy fuel catalyst 6 in order to be treated. The initial exposure and treatment covered a two day period, with 12 hours of circulation being followed by 12 hours of non-circulation in order to simulate intermittent use, as would be typical with a vehicle or generator equipment fitted with the fuel catalyst. During operation the fuel flow rate was maintained at 500 cc/min by use of the fuel pump 4 and the flow meter 8. The flow meter 8 was calibrated manually. The contaminated diesel was subjected to continuous circulation and exposure to the in-line catalyst 6 starting at day three for an additional period of four days. The quality of the diesel was inspected by utilizing UV-Visible spectroscopy by drawing a sample of the fuel from the system using the sampling valve 10. Fuel samples were drawn and inspected at 12-hour intervals during 96 hours of continuous operation.

Prior to treatment, the contaminated diesel fuel was very turbid and dirty. After treatment, there was a decrease in the turbidity that was easily visualized with the human eye. In fact, the color of the diesel fuel changed gradually in direct proportion to the hours of treatment. It should be noted that the system contained no fuel filter element or any other device that would impact the turbidity or cleanliness of the fuel other than the metal alloy catalyst being subjected to testing.

Figure 2:
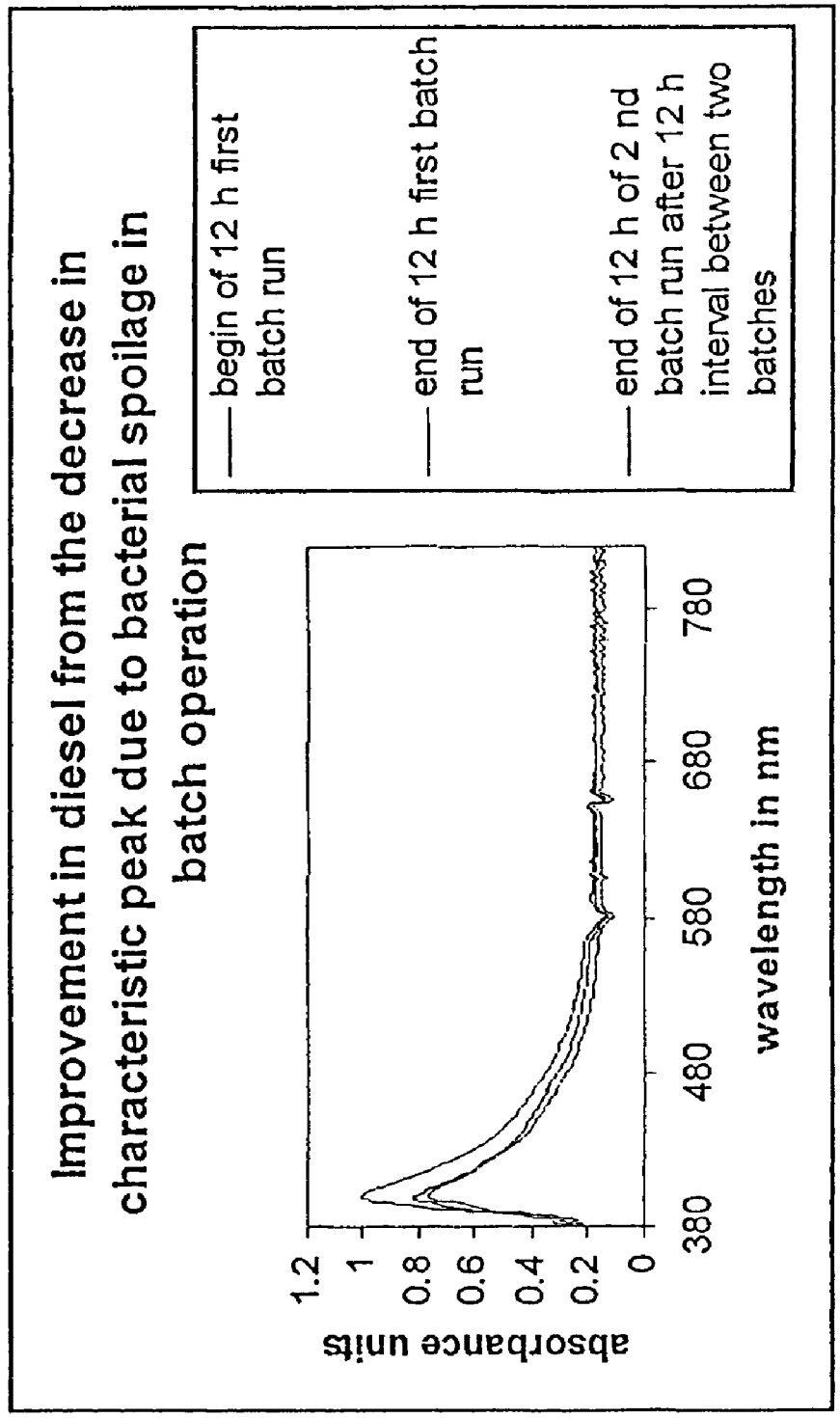
FIG. 2 is a graph illustrating an improvement in diesel fuel from the decrease in characteristic peak due to bacterial spoilage in batch operation as seen in a test of the invention.

To further quantify the visual results, the diesel fuel was further analyzed by UV-VIS spectroscopy, the results of which are shown in FIG. 2. A sample of uncontaminated diesel fuel was taken as the blank for the UV-VIS spectroscopy. The UV-VIS spectroscopy from wavelength 380 nm to 820 nm shows only the extra peaks in the contaminated diesel in relation to the blank of the uncontaminated diesel fuel.

When the contaminated diesel fuel was undergoing exposure to the in-line catalyst 6 during day one and two of intermittent operation (12 hours of circulation followed by 12 hours of non-circulation), the three UV-VIS samples depicted in FIG. 2 were drawn at 12 hour intervals. The characteristic peak at approximately 400 nm decreased. The characteristic peak at approximately 400 nm is an appropriate reference point for measuring the amount of bacterial contamination of the diesel fuel.

Figure 3:
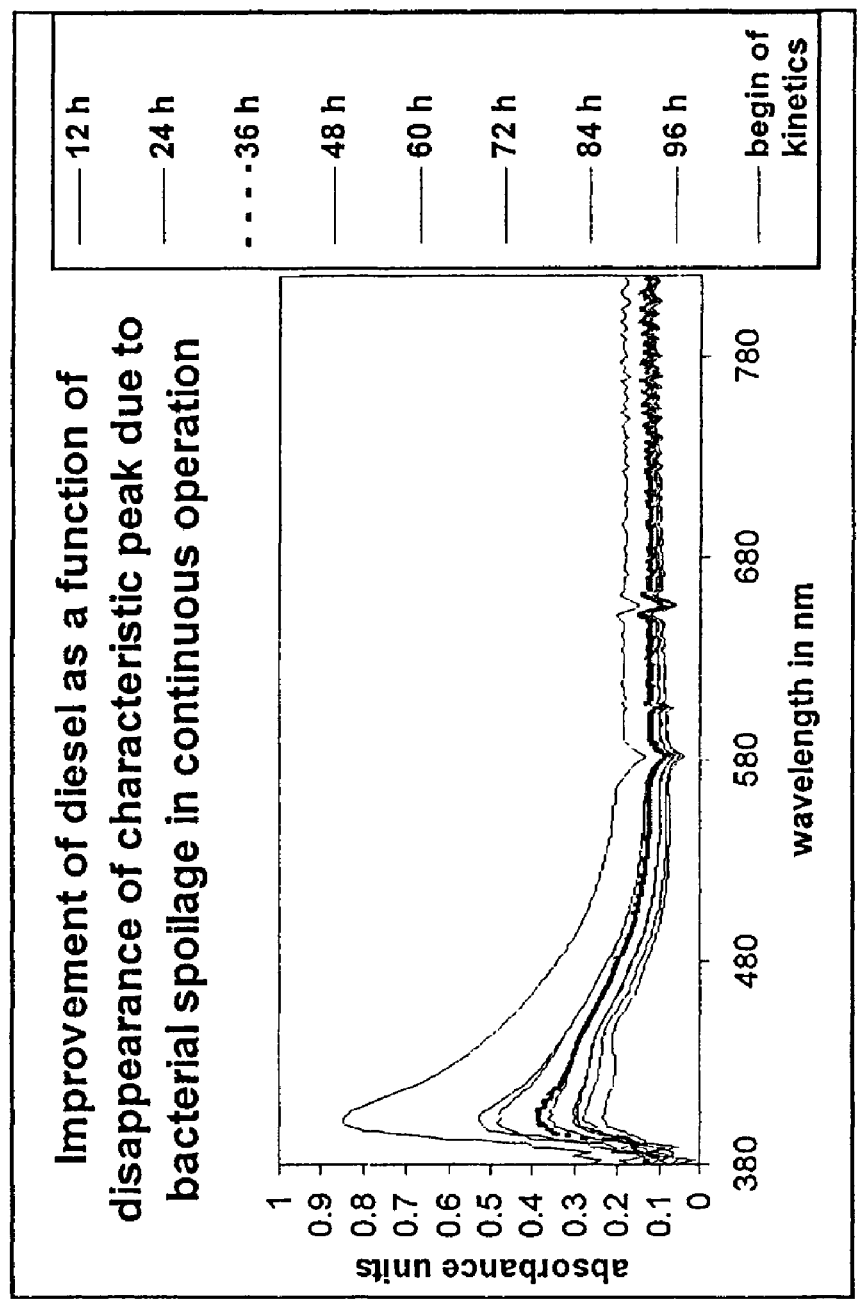
FIG. 3 is a graph illustrating an improvement in diesel fuel as a function of disappearance characteristic peak due to bacterial spoilage in continuous operation as seen in a test of the invention.

The contaminated fuel was additionally subjected to a continuous circulation operation over a 96 hour period. The UV-VIS spectroscopy results of the diesel fuel treatment under continuous circulation are shown in FIG. 3. Fuel was withdrawn every 12 hours and analyzed under UV-VIS spectroscopy. FIG. 3 again reveals that the observable peak at approximately 400 nm gradually decreased with time when the contaminated diesel fuel underwent a continuous circulation with the in-line catalyst 6. The peak at 400 nm decreased drastically over time. The improved diesel fuel demonstrated no peak at all in the UV-VIS spectroscopy compared to the uncontaminated diesel fuel blank.

One observation based on both visual inspection and UV-VIS spectroscopy is that the diesel fuel that turned turbid (over the two-month incubation period), became transparent after treatment with the in-line catalyst 6. The appearance of the peak at approximately 400 nm may be attributed to the presence of bacteria or exogenous by-products of the bacterial metabolic pathway. Ultimately, the peak decrease as seen in FIGS. 2 and 3 is a good indication of suppression of bacterial growth and improvement in the quality of the diesel fuel.

A similar experiment was additionally conducted with 1.5 L of bio-diesel fuel blend that was inoculated with the same species of bacteria and allowed to incubate for 3 months. The bio-diesel fuel blend was a mixture of 80% (v/v) DF-2 diesel fuel and 20% (v/v) Soy Gold AL-25842 (B-100 supplied by Southwest Research Laboratory.) The apparatus as illustrated in FIG. 1 was used as before, including the utilization of the same flow rate. An identical circulating system for testing uncontaminated bio-diesel served as a control.

Culture flasks labeled 1 and 2 containing 50 mL of Bushnell Haas Broth (BHB), 5% blended bio-diesel (v/v), and 1 mL of Pseudomonas Oleovorans inoculum were prepared. Flask 1 served as the blank (no catalyst) while flask 2 contained a catalyst Formula C element cut in half. Only the characteristic surface or thin slice of the top part of the catalyst element was used in the culture flask. The flasks were inspected visually for any differences in turbidity and appearances or disappearances of the blended bio-diesel layer. The BHB salts medium is a typical aqueous inorganic salt medium. The floating bio-diesel blend layer can be distinguished by a distinct yellow-orange color. The gradual disappearance of the bio-diesel blend layer is indicative of the decomposition of the bio-diesel blend components by the bacterial inoculum.

Figure 4:
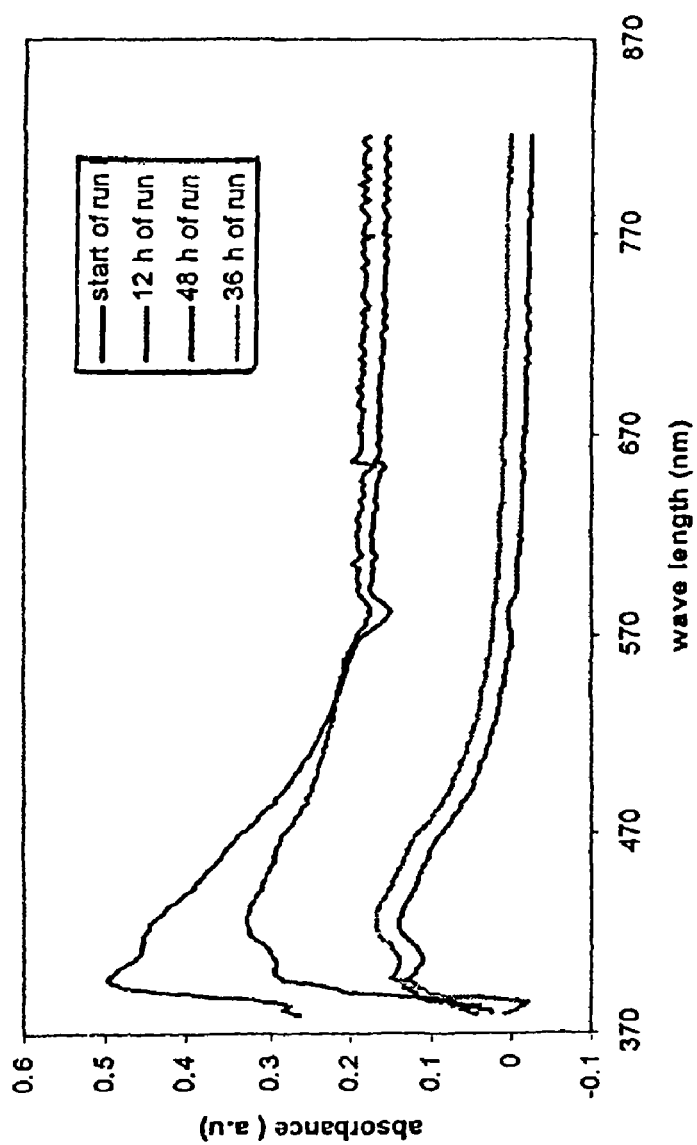
FIG. 4 is a graph illustrating an improvement in a bio-diesel fuel as seen in a test of the invention.

The contaminated bio-diesel in the in-line circulation system that included the in-line catalyst 6 showed marked differences as again evident in the absorbance of UV-VIS spectroscopy. An uncontaminated bio-diesel blend was used as the blank for this analysis. FIG. 4 shows the results of this analysis. The appearance of a peak at around 400 nm and 428 nm in the UV-Visible spectrum from the inoculated bio-diesel blend, as seen in FIG. 4, shows that the bacteria produce measurable differences in the composition of the bio-diesel blend as compared to the uncontaminated bio-diesel blank. As FIG. 4 shows, these peaks decrease with time and reach a saturation level. In addition, differences in visual color were also evident. Suspended particulate matter was evident in the infected bio-diesel blend. These particulates settled at the bottom of the fuel reservoir 2. The same particulates were not evident after exposure to the in-line catalyst 6. In contrast, control experiments with uncontaminated bio-diesel did not exhibit the extra peaks in the UV-VIS spectroscopy.

The culture flasks remained under still conditions for 4-5 months. Following this, the culture flasks showed obvious differences. The culture flasks without the catalyst went through severe decomposition of the bio-diesel blend layer, as the separate floating layer was practically absent. Only a patch of the bio-diesel blend was left on the top layer and much of the bio-diesel layer was lost or otherwise disintegrated, as was evidenced by the existence of particulate matter on the bottom of the culture flask. When the flask without the catalyst was shaken the remainder of the bio-diesel layer was encapsulated by the aqueous phase and formed small oily droplets. This was not observed in the culture flask that had the catalyst Formula C present.

The most remarkable difference between the effect of the bacteria on pure diesel fuel (DF-2) and B20 bio-diesel was that the turbidity of the pure diesel fuel was more evident while particulates in the contaminated bio-diesel were more evident. Bio-diesel is an oxygenated fuel made from vegetable oils, waste cooking oil, or animal fats by reaction of triglyceride fats therein with methanol to form methyl esters by way of transesterification. From past literature, when methyl soyate is used as a bio-diesel blend component, microbial growth from *Bacillus* bacteria was inhibited compared to bacterial growth in pure diesel. Therefore, evidence suggests that the bacterial action in a bio-diesel blend is far different from pure diesel fuel. The breakdown of the bio-diesel blend components by the *Pseudomonas* species in the above described experiments shows that bio-diesel by itself is more susceptible to bacterial spoilage. The appearance of turbidity in the aqueous phase in the culture flask with the catalyst shows the presence of bacterial growth, but at the same time the bio-diesel blend layer is not destroyed. The catalyst slows down bio-diesel spoilage. The appearance of the extra peaks in the UV-VIS spectroscopy as seen in FIG. 4 may be a result of a change in chemical composition, waste metabolites, or fragments of the bacterial cell.

As demonstrated above, the Formula C catalyst, in addition to serving in the conventional sense to improve combustion efficiency, can also be utilized to remove bio-contamination from hydrocarbon fuel products, as the above experimental results conclusively illustrate. The invention, however, is not limited to the Formula C catalyst, but may include other metal alloy catalysts used to improve combustion efficiency. For example, the inventors have also found other formulations of metal alloy fuel catalysts, including a three component catalyst including about 70% Sn, about 20% Sb, and about 10% Bi can also be employed to improve combustion efficiency and/or eliminate bio-contamination.

The inventors have also recognized the importance of solid acid catalysts where Bronsted and Lewis sites play an important role. Their presence is crucial for catalytic processes like hydrocarbon isomerization, cracking, alkylation, hydrogenation, dehydrogenation, cyclization, etc. These heterogeneous catalysts offer several advantages: insolubility in the product, reusability, and increased product purity, among other advantages. From the point of view of Bronsted acidity, the solid acid is able to donate, or at least partially transfer, a proton that becomes associated with anions. For the Lewis definition, the solid acid must be able to accept an electron pair.

Between the compounds that involve tin as a support for catalytic activities there are several combinations. Transition metal oxides of the group VIB, ($MO_3$), where M=Cr, Mo, and W, are among the most used. The acid strength of the support metal oxide $MoO_3/SnO_2$ is reportedly stronger than those for zeolites HY and HZSM-5. The interaction of $MoO_3$ with $SnO_2$ leads to the formation of new Bronsted acid sites on the $MoO_3/SnO_2$ catalyst with acid strength much stronger than that of the SnOH groups originally present on $SnO_2$ support. Mo species are mainly dispersed on the surface of $SnO_2$ support rather than dissolved in the $SnO_2$ structure. Some of the bonds that have been confirmed in the $MoO_3/SnO_2$ system are:

Mo=O
Mo—O—Mo
Mo—O—Sn

Bronsted acid sites are associated with the following bonds:

Mo(OH)
Mo—(OH)—Sn
Mo—(OH)—Mo.

Other bimetallic phases that involve tin for catalytic activities are the systems: Pt—Sn, Pt—Ir—Sn/$AlO_2$. These bimetallic and three metallic catalysts consist of Platinum as the primary metal and a second metal such as Rhenium, Iridium, or Tin. These catalysts include:

Pt—Sn/Alumina,
Pt—Ir—Sn/Alumina
Pt—Ir/$SiO_2$.

It has been found that Bronsted acidity decreases when the tin content increases, no matter what the catalyst. The total number of Lewis sites increases when the tin content, depending on the type of combination increases up to a certain weight percentage. For example, a linear increase of the Lewis acidity is observed with the increase of tin content for the system Pt—Sn.

Other important materials use metal oxides like $SO_4^{2-}$, $MoO_3$, $WO_3$, and $V_2O_5$ spread on supports like $SnO_2$, $ZrO_2$, and $TiO_2$. The catalytic material combinations with strong acidity are: $SO_4^{2-}$ on $ZrO_2$, $MoO_3$, and $V_2O_5$ on $TiO_2$, where the strength of the acid site on the monolayer is influenced by the loaded metal oxide and the support. The following are some of the systems used for catalytic activity and include several Sn containing systems:

| | | |
|---|---|---|
| $TiO_2$—$SnO_2$ | $ZrO_2$—$SnO_2$ | $CeO_2$—$SnO_2$ |
| $Ln_2O_3$—$SnO_2$ | $MoO_3$—$ZrO_2$ | $MoO_3$—$TiO_2$ |
| $MoO_3$—$Al_2O_3$ | Pt—Sn | Pt—Ir—Sn/$Al_2O_3$ |
| Pt—Ir/$SiO_2$ | Pt/$Al_2O_3$ | $V_2O_5$—$_{WO3}$ |
| $CrO_x/V_x$ | $MnO_x/VO_x$ | $SnO_x/VO_x$ |
| $WO_x/VO_x$ | $NbO_x/VO_x$ | $TaO_x/VO_x$ |
| $MoO_x/VO_x$ | $ZrO_x/VO_x$ | $BiO_x/VO_x$ |
| Co | | |

Fuel catalysts employing these combinations and others, including cerium and/or cerium oxide, may also be utilized to improve combustion efficiency and/or eliminate bio-contamination.

The invention has been described with reference to certain preferred embodiments thereof. It will be understood, however, that modifications and variations are possible within the scope of the appended claims. For example, it should be noted that the catalyst need not be formed as an in-line component, or as a bulk or drop-in element as described in the previously mentioned U.S. Pat. Nos. 5,580,359; 5,738,692; 6,000,381; 6,306,185; and 6,770,105, but instead, the catalyst can alternatively be formed as a thin film alloy, nano-structure, film or membrane as disclosed in U.S. patent application Ser. No. 11/204,228, U.S. patent application Ser. No. 11/220,340, and U.S. Pat. No. 6,503,476, the contents of each of which are incorporated herein by reference. Still further, methods of foaming metals and metal alloys have been developed that can be utilized to form the fuel catalyst or structures upon which the fuel catalyst can be coated. Accordingly, the fuel catalyst can take any desired structural form.

What is claimed is:

1. A method of decontaminating a hydrocarbon fuel as claimed comprising: exposing the fuel to a surface of a metal alloy fuel catalyst, wherein the metal alloy fuel catalyst consists of about 70% Sn, about 22% Sb, about 4% Bi, and about 4% Pb as catalyst materials, and does not include Hg as a catalyst material.

2. A method of decontaminating a hydrocarbon fuel as claimed comprising: exposing the fuel to a surface of a metal alloy fuel catalyst consists of about 70% Sn, about 20% Sb, and about 10% Bi as catalyst materials, and does not include Hg as a catalyst material.

3. A metal alloy fuel catalyst for improving combustion which consists of: about 70% Sn, about 22% Sb, about 4% Bi, and about 4% Pb as catalyst materials, and does not include Hg as a catalyst material.

4. A metal alloy fuel catalyst as claimed in claim 3, wherein the metal alloy fuel catalyst is formed as a thin film.

5. A metal alloy fuel catalyst as claimed in claim 3, wherein the metal alloy fuel catalyst is formed as a nano-structure.

6. A metal alloy fuel catalyst for improving combustion efficiency which consists of: about 70% Sn, about 20% Sb, and about 10% Bi as catalyst materials, and does not include Hg as a catalyst material.

7. A metal alloy fuel catalyst as claimed in claim 6, wherein the metal alloy fuel catalyst is formed as a thin film.

8. A metal alloy fuel catalyst as claimed in claim 6, wherein the metal alloy fuel catalyst is formed as a nano-structure.

* * * * *